3,506,606
4-HALOTETRAHYDROPYRANS AS PLASTICIZER AND EXTRUSION AIDS FOR POLYVINYL FLUORIDE
Harold Wayne Hill, Jr., and Paul R. Stapp, Bartlesville, Okla., assignors to Phillips Petroleum Company, a corporation of Delaware
No Drawing. Filed July 17, 1967, Ser. No. 653,650
Int. Cl. C08f 45/34
U.S. Cl. 260—30.4                                13 Claims

ABSTRACT OF THE DISCLOSURE 4-halotetrahydropyrans are employed as plasticizers and extrusion aids for polyvinyl fluoride.

---

This invention relates to plasticization of polyvinyl fluoride. In another aspect, this invention relates to plasticized polyvinyl fluoride compositions. In a further aspect, this invention relates to improved extrusion aids for polyvinyl fluoride.

Polyvinyl fluorides are useful as external surface laminates for the fabrication of construction materials that are to be exposed to weathering because of their high strength and durability under extreme weather conditions. Films of such polymers are of particular importance. These films are currently laminated to wood, metal, and other plastics for use primarily where long-term outdoor weatherability is desired or where deleterious materials contaminate the environment. Very clear films are aesthetically desirable when laminating to finished wood surfaces for many applications.

However, problems have occurred in fabricating polyvinyl fluoride sheets, films, strips, and the like, because of the non-availability of suitable plasticizers and extrusion aids. An ideal extrusion aid for polyvinyl fluoride is a compound that will substantially completely plasticize the polymer under relative low temperature and pressure conditions with a minimum of admixing and yet after the extrusion operation, a major portion of the compound be readily removable from the formed article by slight heating and/or washing operations. This is particularly true when producing oriented film wherein a temperature of about 180° C. or higher will cause much of the film orientation to be lost.

Vinyl fluoride polymers are unique because, as a rule, plasticizers and extrusion aids for other polyvinyl halides such as polyvinyl chloride are generally ineffective with polyvinyl fluorides. For example, well-known plasticizers for polyvinyl chloride such as methyl ethyl ketone, tetrahydrofuran, dioxane, toluene, methylene chloride, ethylene dichloride, and nitrobenzene will not effectively plasticize polyvinyl fluoride. When polyvinyl fluoride particles are admixed with the conventional plasticizers for polyvinyl chloride, no effective coalescence of the polyvinyl fluoride will result.

Only a few materials are known to be effective plasticizers and extrusion aids for polyvinyl fluoride. For example, gamma butyrolactone is probably the leading commercially available plasticizer and extrusion aid for polyvinyl fluoride. Other known plasticizers for polyvinyl fluoride include tetramethylene sulfone, dimethyl sulfolane and N,N-dimethylacetamide. Generally, these materials require relatively high temperatures to completely coalesce the polyvinyl fluoride particles and form a single phase composition. Also, these materials generally impart a noticeable haze to the formed article after extrusion and/or molding, for example, to an extruded film. In addition, the use of these materials often results in undesirable physical properties of the formed polyvinyl fluoride articles such as poor elongation properties. Therefore, improved plasticizers and extrusion aids for polyvinyl fluoride are a continuing need in the art.

In accordance therewith, one object of this invention is to provide improved plasticizers and extrusion aids for polyvinyl fluoride.

Another object of this invention is to provide improved plasticized polyvinyl fluoride blends.

According to this invention, we have found that certain 4-halotetrahydropyrans and mixtures thereof will effectively plasticize polyvinyl fluoride. We have found that these 4-halotetrahydropyrans are particularly useful as extrusion aids for polyvinyl fluoride, and as such, have important advantages over commercial extrusion aids for polyvinyl fluoride.

The 4-halotetrahydropyran compounds of this invention can be represented as follows:

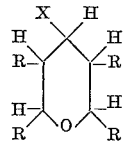

wherein X is a halo radical such as fluorine, chlorine, bromine, or iodine, and R is chosen from hydrogen or hydrocarbyl radicals such as alkyl, cycloalkyl, aryl, or combinations thereof, containing from 1 to 8 carbon atoms per radical and where the total number of carbon atoms in the compound does not exceed 17. The 4-halotetrahydropyrans which contain from about 5 to 8 carbon atoms per molecule are generally preferred. Particularly preferred are the 4-chlorotetrahydropyrans containing from about 5 to 8 carbon atoms per molecule. Examples of suitable 4-halotetra-hydropyran compounds include 4-chlorotetrahydropyran,
4-bromotetrahydropyran,
4-iodotetrahydropyran,
4-fluorotetrahydropyran,
3-methyl-4-chlorotetrahydropyran,
3-octyl-4-chlorotetrahydropyran,
2-propyl-4-chlorotetrahydropyran,
2,6-dihexyl-4-fluorotetrahydropyran,
4-chloro-2,3,6-tributyltetrahydropyran,
4-chloro-2,3,5,6-tetramethyltetrahydropyran,
3-benzyl-4-chlorotetrahydropyran,
4-bromo-3-cyclohexyltetrahydropyran,
4-chloro-2-methyl-5-phenyltetrahydropyran,
4-chloro-3-(2-methylcyclopentyl)tetrahydropyran, and the like and mixtures thereof.

The 4-halotetrahydropyrans of this invention can be synthesized by any method known in the art. One method of synthesizing 4-halotetrahydropyrans is disclosed in Chemical Abstracts 51, 1156 (1957).

Any conventional polyvinyl fluoride resin can be plasticized by the 4-halotetrahydropyrans of this invention. These resins are available as items of commerce or can be readily synthesized by conventional means. A "conventional polyvinyl fluoride resin" is construed to mean both a homopolymer and copolymers resulting from the incorporation of small amounts of a comonomer into a substantially vinyl fluoride polymer. These comonomers generally comprise less than 5 weight percent of the total polymer, but higher ratios are sometimes used. Examples of such comonomers would include the following: propylene, isobutylene methyl methacrylate, vinyl acetate, vinyl ethers, vinylidene fluoride, tetrafluoroethylene, vinyl stearate, N-vinyl pyrrolidone, vinyl ketones, acrylonitrile, styrene and the like.

The 4-halotetrahydropyrans of this invention can be used as extrusion aids to effect improved results in conventional processes for the extrusion of polyvinyl fluoride. One advantage of these 4-halotetrahydropyrans is that considerably lower temperatures can be employed to extrude polyvinyl fluoride than are presently needed with conventional extrusion aids. For example, temperatures of about 200° C. are normally required to obtain good films when gamma-butyrolactone is employed as an extrusion aid. However, with the 4-halotetrahydropyrans of this invention, lower fabrication temperatures can be employed. This results generally in a savings of heat energy. Furthermore, films prepared wherein the 4-halotetrahydropyrans of this invention are used as extrusion aids are clearer and of higher quality than those prepared with prior art materials such as gamma-butyrolactone. Other advantages apparent to those skilled in the art are inherent within the spirit and scope of this invention.

The 4-halotetrahydropyrans can be incorporated into polyvinyl fluoride in any desired amount. A preferred range of incorporation is 20 to 400 parts by weight of 4-halotetrahydropyran for each 100 parts by weight of polyvinyl fluoride. A more preferred incorporation range is 40 to 150 parts by weight of 4-halotetrahydropyran for each 100 parts by weight of polyvinyl fluoride. However, the ratio used can be either higher and lower than the preferred ranges, depending, for example, upon the particular 4-halotetrahydropyran or mixture thereof, and the particular application.

The admixing of the 4-halotetrahydropyran and polyvinyl fluoride is conveniently effected in extrusion operations by introducing particulate polyvinyl fluoride and the 4-halotetrahydropyran or mixture thereof into a heated extruder barrel having a rotating screw positioned therein which serves to thoroughly admix the components and convey the resulting admixture to an appropriate extrusion die. This admixing occurs at a temperature and for a time sufficient to coalesce the polyvinyl fluoride and form a uniform dispersion. The incorporation of 4-halotetrahydropyran with the polyvinyl fluoride can also be carried out by any other conventional means such as blending, milling, or rolling processes, which, for example, use a Banbury mixer or a heated roll mill.

Admixing and extrusion temperatures in the range of 120° C. to about 150° C. are preferred, although temperatures above and below this range can be employed if desired. Extrusion pressures normally known in the art for the extrusion of polyvinyl halide resins can be employed. Conventional extrusion pressures generally range from 300 p.s.i.g. to 20,000 p.s.i.g.

When using the 4-halotetrahydropyrans as extrusion aids, it is generally desirable to remove a major portion of the 4-halotetrahydropyrans from the extrudate after the extrusion operation. The amount of these pyrans removed will depend to a great degree upon the particular application to which the product is to be put. It is normally desirable to remove substantially all of the 4-halotetrahydropyrans from the extruded film, so that, for example, the finished film will contain no more than about 0.2 weight percent of the 4-halotetrahydropyran. This is done conveniently by heating and/or washing operations. For example, the extruded film of, say, 0.1 to 20 mils thickness is heated, preferably under vacuum, to a temperature near the boiling point of the particular 4-halotetrahydropyran employed as an extrusion aid (at the pressure employed) for a sufficient time to substantially completely remove the 4-halotetrahydropyran contained therein. If desired, a solvent washing operation can be used alone or concurrently with the heating operation. Suitable solvents, to be employed in such washing, include methanol, ethanol, water, isopropanol, acetone, methyl ethyl ketone, dioxane, ethylene dichloride, the like, and mixtures thereof. Of course, as is well known to the art, the 4-halotetrahydropyran and/or said solvents can be separated and reused, if desired.

As previously stated, the use of the 4-halotetrahydropyrans as an extrusion aid for polyvinyl fluoride will yield molded articles with improved properties such as clarity and elongation tendencies. This is particularly advantageous when manufacturing film, preferably film to be laminated to surfaces such as hardwood and polywood surfaces. This clear film is also particularly useful in such applications as automobile seat covers, upholstery covers, and the corrosion resistant coatings for metal surfaces.

The following examples illustrate this invention more clearly; however, they are not intended to be construed as limiting the scope thereof.

EXAMPLE I

A dispersion was formed by thoroughly blending nine parts by weight of polyvinyl fluoride and 10.5 parts by weight of 4-chlorotetrahydropyran. The mixture thus comprised about 117 parts by weight of 4-chlorotetrahydropyran per 100 parts by weight of polyvinyl fluoride. Approximately seven grams of this mixture was placed between stainless steel plates and compression molded at 135° C. to 140° C. and to 23,000 pounds plate pressure for ten minutes. Good flow between the plates was obtained. The film was cooled to about 50° C. in the press while under pressure and subsequently stripped from the plates. The extrusion aid laden film was then loosely clamped in a drying frame and washed first with methanol and then with water to remove the 4-chlorotethydropyran. The film was allowed to shrink, clamped firmly in the drying frame, wiped of excess water, and dried in an oven for fifteen minutes at 110° C., and subsequently for ten minutes at 160° C. An elongation break specimen was cut from the dried film using a die with a gauge, 1 inch long and 0.25–0.5 inch wide. The specimen was pulled at a cross-head speed of 20 inches per minute with a jaw-to-jaw separation of 1 inch. Film haze was also determined. Data from the elongation break test and the haze test are included in Table I which follows Example II.

EXAMPLE II

A second dispersion was formed by thoroughly blending nine parts by weight of polyvinyl fluoride with 10.5 parts by weight of gamma-butyrolactone to form a mixture comprising 117 parts by weight of gamma-butyrolactone, per 100 parts by weight polyvinyl fluoride. Approximately, 7 grams of this mixture was molded between the stainless steel plates under the same conditions as Example I. This material was cooled under pressure to 50° C. as before and washed with water (gamma-butyrolactone in contrast to 4-chlorotetrahydropyran is very soluble in water). Drying was effected as illustrated in Example I. The elongation break test and the haze test were run on the extruded film. The film extruded with gamma-butyrolacetone was somewhat colored and had considerable haze relative to the film extruded with 4-chlorotetrahydropyran. Data from the two tests follow in Table I.

TABLE I.—PROPERTIES OF THE POLYVINYL FLUORIDE FILMS OF EXAMPLES I AND II

|  | 4-chlorotetrahydropyran as aid | Gamma-butyrolactone as aid |
| --- | --- | --- |
| Elongation break, percent [1] | 124 | 100 |
| Haze, percent [2] | 14.2 | 46.6 |

[1] ASTM D-638.
[2] ASTM 1003.

Thus, as illustrated in Table I, the film extruded with 4-chlorotetrahydropyran as an extrusion aid exhibited superior elongation properties. The data also demonstrate that the film extruded employing 4-chlorotetrahydropyran as an extrusion aid is much clearer than the film extruded employing gamma-butyrolactone. Therefore, as illustrated, the use of the 4-chlorotetrahydropyran is a definite improvement over the use of gamma-butyrolacetone as an extrusion aid for polyvinyl fluoride. It is noted that gamma-butyrolactone is probably the most commercially used extrusion aid for polyvinyl fluoride today.

We claim:

1. A composition comprising polyvinyl fluoride resin together with at least one compound having the general formula:

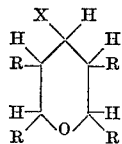

wherein X is a halogen, and R is selected from hydrogen, alkyl radicals, cycloalkyl radicals, aryl radicals, or combinations thereof containing from 1 to 8 carbon atoms per radical, and wherein the total number of carbon atoms in the compound does not exceed 17.

2. The composition of claim 1 wherein 20 to 400 parts by weight of said compound is present for each 100 parts by weight of said polyvinyl fluoride resin.

3. The composition of claim 1 wherein from 40 to 150 parts by weight of said compound is present for each 100 parts by weight of said polyvinyl fluoride resin.

4. The composition of claim 1 wherein said compound is selected from 4-chlorotetrahydropyran, 4-bromotetrahydropyran, 4-fluorotetrahydropyran, and 4-iodotetrahydropyran.

5. The composition of claim 4 wherein said compound is 4-chlorotetrahydropyran.

6. A method of plasticizing polyvinyl fluoride resin comprising heating and admixing polyvinyl fluoride resin with at least one compound having the general formula:

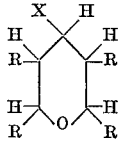

wherein X is a halogen, and R is selected from hydrogen, alkyl radicals, cycloalkyl radicals, aryl radicals, or combinations thereof, containing from 1 to 8 carbon atoms, and wherein the total number of carbon atoms in the compound does not exceed 17, sufficiently to coalesce the polyvinyl fluoride resin and form a uniform fluid phase.

7. The method of claim 6 wherein from 20 to 400 parts by weight of said compound is admixed with every 100 parts by weight of the polyvinyl fluoride resin.

8. The method of claim 6 wherein said compound is selected from 4-chlorotetrahydropyran, 4-bromotetrahydropyran, 4-fluorotetrahydropyran and 4-iodotetrahydropyran.

9. The method of claim 6 wherein said compound is 4-chlorotetrahydropyran.

10. The method of claim 6 further comprising extruding said admixture from an extrusion die to produce a formed article and removing substantially all of said compound from said formed article.

11. The method of claim 10 wherein said compound is removed by heating said article to the boiling point of said compound.

12. The method of claim 10 wherein said compound is removed from said article by washing said article with a solvent for said compound.

13. The method of claim 12 wherein said solvent is methanol.

References Cited

UNITED STATES PATENTS

| | | | |
|---|---|---|---|
| 2,479,957 | 8/1949 | Newkirk | 260—30.4 |
| 3,014,045 | 11/1961 | Marcus | 260—30.4 |
| 3,030,385 | 4/1962 | Marcus | 260—30.4 |
| 3,037,994 | 6/1962 | Marcus | 260—30.4 |
| 3,324,069 | 6/1967 | Koblitz | 260—30.4 |

MORRIS LIEBMAN, Primary Examiner

P. R. MICHL, Assistant Examiner

U.S. Cl. X.R.

260—345.1